2 Sheets—Sheet 1.
P. L. WEIMER.
TUYERES.
No. 194,063. Patented Aug. 14, 1877.
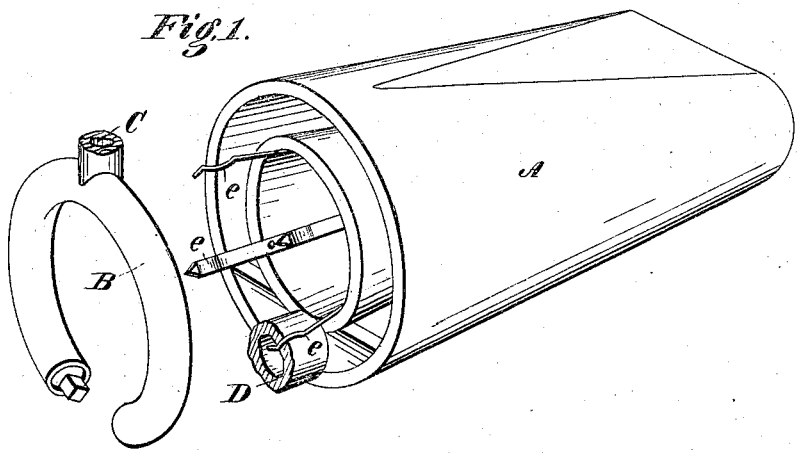
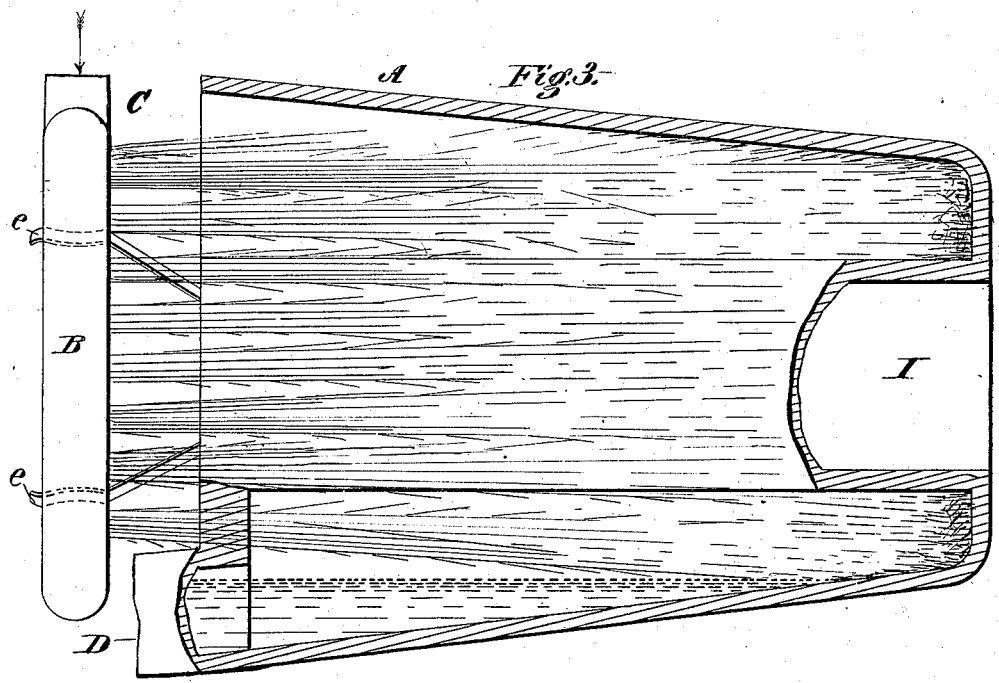
Witnesses:
Donn P. Twitchell.
Will W. Dodge.
Inventor:
P. L. Weimer,
by his Attys
Dodge & Son.

2 Sheets—Sheet 2.
P. L. WEIMER.
TUYERES.
No. 194,063. Patented Aug. 14, 1877.
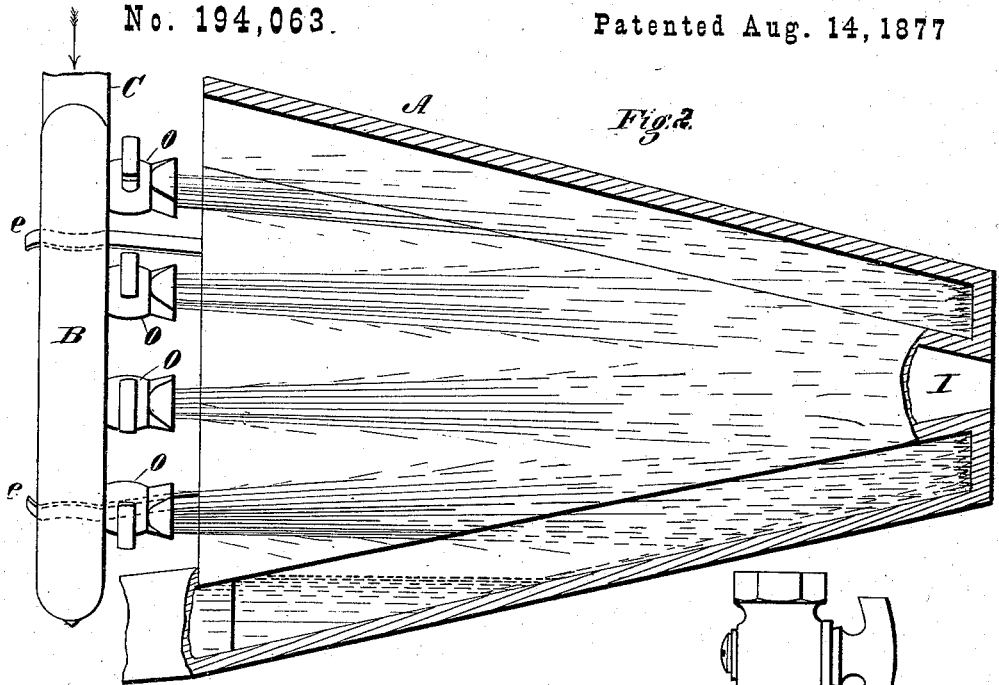
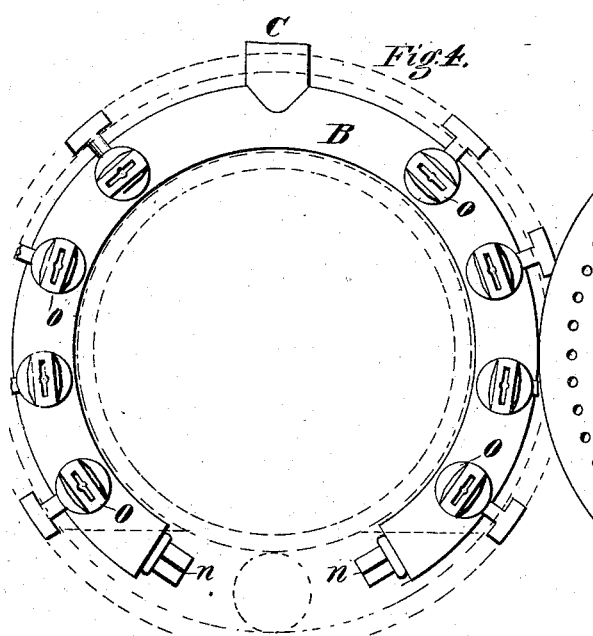
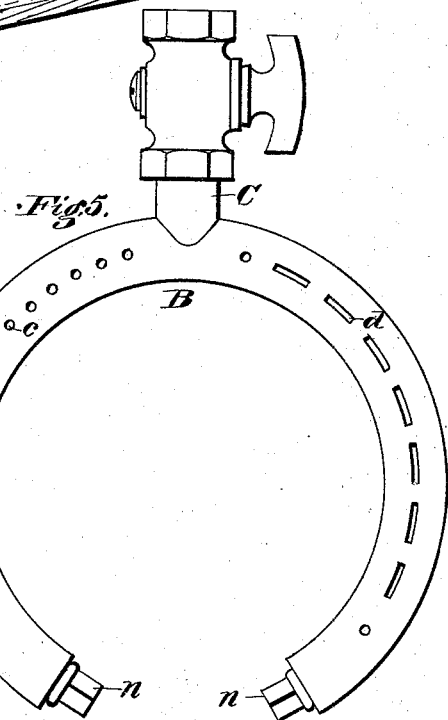
Witnesses:
Inventor:

UNITED STATES PATENT OFFICE.

PETER L. WEIMER, OF LEBANON, PENNSYLVANIA.

IMPROVEMENT IN TUYERES.

Specification forming part of Letters Patent No. 194,063, dated August 14, 1877; application filed June 1, 1877.

*To all whom it may concern:*

Be it known that I, PETER L. WEIMER, of Lebanon, in the county of Lebanon and State of Pennsylvania, have invented certain Improvements in Tuyeres, of which the following is a specification:

My invention relates to tuyeres for blast and other furnaces, forges, &c.; and the invention consists in a pipe arranged opposite the rear open end of the tuyere, in such a manner as to deliver the water used for cooling the tuyere in jets over all the space within the hollow walls thereof, and in so arranging said water-pipe that it can be easily and readily removed, and the perforations for the jets shall be outside of the tuyere, where the clogging or choking of them by sediment of any kind can be readily detected.

Figure 1 is a perspective view of my improved form of tuyere, with the water-pipe detached. Fig. 2 is a side elevation, partly in section, of the same. Fig. 3 is a similar view of the round-nosed tuyere, with my improvements applied; and Figs. 4 and 5 are face views of the water-pipe, showing various modifications.

Various styles of tuyeres have heretofore been constructed, the main object in all cases being to keep them cool by the application of water to the space between the hollow walls. Formerly this space was closed at both ends, the water entering through one pipe and escaping by another, these pipes being so arranged as to keep the space filled with water.

Experience has demonstrated that tuyeres thus constructed do not give the best results, they being not unfrequently exploded by the formation of steam within them, at other times the steam thus formed interfering with the free circulation of the water, and preventing it from keeping the nose of the tuyere cool, as was intended, so that it was often injured or destroyed by the intense heat, even while containing more or less water.

More recently tuyeres have been made with the rear end of their hollow walls left open, and with the water-pipes arranged between the walls in such a manner as to deliver a series of jets or a spray of water upon the inner surface of said walls, which plan is found to give better results, but is necessarily expensive, because of the difficulty and labor of arranging the pipes properly within the space between the walls, and, moreover, this plan necessitates much labor and delay whenever it becomes necessary for any reason to change or replace the tuyere; and these difficulties are increased by the fact that tuyeres are made of various sizes, the pipes in each particular case having to be arranged to correspond with the size and form of the tuyere.

Another objection to locating the spray-pipes within the hollow chamber of the tuyere is that, being out of sight, it is impossible to tell when more or less of the perforations become closed by sediment, and consequently the jets of water may cease to play upon portions of the walls without any outward indication of that fact.

The object of my present invention is to obviate these difficulties or objections, and furnish a tuyere which shall possess all the advantages of the latter class, besides some not possessed by any others, and at the same time be much simpler and cheaper to make, and in which also the water-pipe shall be so arranged that it can be more quickly and easily removed and replaced.

To accomplish these objects I construct the tuyere A in any desired form, but preferably in the form shown in Figs. 1 and 2, in which the nozzle or inner end is flattened or made of an oval shape. By this means the air-blast is delivered through an opening which is narrower vertically and wider laterally than in the ordinary or round-nosed tuyere, and which is therefore less likely to become obstructed or choked by the material within the furnace or forge.

Whatever the form of the tuyere, whether the nozzle be circular or oval, it is made with hollow walls, with the rear or outer end left open, with the exception of a small portion across the lower side, as shown in Figs. 1, 2, and 3, that being the point where the discharge-pipe D is attached to convey away the water after it has been injected into the space between the hollow walls.

I then provide a delivery-pipe, B, which is bent in a circular form, as shown in Figs. 1, 4, and 5, it having a supply-pipe, C, attached, and having one or more openings stopped by plugs n, or any equivalent means for removing any sediment that may accumulate therein. Instead of having the pipe B terminate in the two ends, it may be made in the form of a complete circle, if desired; but the plan shown is considered preferable, because the space between its ends permits the waste-pipe D to extend out in a direct line at that point.

The circular pipe B, I make of such form and size as to correspond with the rear end of the tuyere, and so that when placed in position it will come directly opposite the open space between the walls of the tuyere, as shown in Figs. 2 and 3. This pipe B is provided on its face, opposite the tuyere, with a series of perforations, which may be in the form of round holes c, as shown on the left-hand side of Fig. 5, or in the form of slits d, as shown on the right-hand side of said figure; or, instead of these, a series of small nozzles, O, with or without stop-cocks, may be inserted in the pipe B, as shown in Figs. 2 and 4. By making the ends of these nozzles O flattened, and providing them with slits in their ends, as shown in Fig. 4, the water will be discharged therefrom in flat fan-like jets, which will spread out as they proceed, thus covering a much larger space upon the walls of the tuyere than they would if thrown in small round jets.

As these nozzles are screwed into the pipe, they can be turned so as to throw the broad fan-like jet in such a manner that it will impinge upon the walls of the tuyere at any desired point, and by curving or bending the nozzles slightly the direction of the jets may be varied at will, by turning the nozzles more or less in their seats—that is to say, the separate jets may be made to converge or spread apart as may be desired, and thus the same pipe may be used with tuyeres of different sizes and shapes.

In order to provide a convenient means of holding the pipe B in position, I attach to the rear end of the tuyere A a series of spring-arms, e, as shown in Fig. 1, their outer ends being curved, so as to clasp and hold the pipe B in the required position, directly opposite the open space between the inner and outer walls of the tuyere, as shown in Figs. 2 and 3.

It is obvious that other means may be used for holding the pipe B in position without at all affecting its operation.

In order to give still greater range to the adjustability of the nozzles O, so as to vary still more the angle or direction in which the jet therefrom shall be thrown, these nozzles may be set into the pipe B in an inclined or oblique position; or they may be set in straight, and have their ends bent more or less to one side, in which latter case it will be seen that by turning them the jets may be made to converge or spread asunder, more or less, at the will of the operator, and thus the jets can be so directed as to deliver the cold water direct upon the hottest portions of the tuyere, and also can be so directed as to conform to tuyeres of various sizes and forms. Even if the jets be thrown directly forward, as shown in Figs. 2 and 3, it will be seen that they will impinge upon the inclined surfaces, and, being thereby deflected, will be thrown against other portions of the surfaces, thus insuring the delivery of the water over the entire surface.

By these improvements it will be seen that the cost of construction is very much reduced, and that whenever desired the pipe B can be instantly detached and a new tuyere substituted; and also that, by having the spray or jet pipe located outside of the tuyere, where the jets can seen, the attendant can at any time detect the stoppage of any of the jets and instantly apply a remedy.

Having thus described my invention, what I claim is—

1. The combination of a tuyere, A, open at its rear end, with a perforated water-pipe, B, located opposite the open end and outside of said tuyere, substantially as shown and described.

2. The supply-pipe B, provided with the nozzles O, when constructed and arranged to operate in combination with the open-ended tuyere A, substantially as described.

3. In combination with the tuyere A and water-pipe B, the spring-arms e, constructed to operate substantially as set forth.

PETER L. WEIMER.

Witnesses:
JOHN BIRKINBINE,
W. G. SANDS.